(12) United States Patent
Collomb

(10) Patent No.: US 8,587,589 B2
(45) Date of Patent: Nov. 19, 2013

(54) IMAGE RENDERING

(75) Inventor: Cedrick Stanislas Collomb, San Francisco, CA (US)

(73) Assignee: Sony Computer Entertainment Europe Limited (GB)

( * ) Notice: Subject to any disclaimer, the term of this patent is extended or adjusted under 35 U.S.C. 154(b) by 1490 days.

(21) Appl. No.: 10/580,310

(22) PCT Filed: Nov. 2, 2004

(86) PCT No.: PCT/GB2004/004632
§ 371 (c)(1),
(2), (4) Date: Apr. 17, 2007

(87) PCT Pub. No.: WO2005/055149
PCT Pub. Date: Jun. 16, 2005

(65) Prior Publication Data
US 2007/0273691 A1    Nov. 29, 2007

(30) Foreign Application Priority Data
Nov. 27, 2003    (GB) .................................. 0327622.7

(51) Int. Cl.
G06T 15/10    (2011.01)

(52) U.S. Cl.
USPC ............................ 345/427; 345/419; 345/426

(58) Field of Classification Search
USPC ......................................... 345/419, 426–427
See application file for complete search history.

(56) References Cited

U.S. PATENT DOCUMENTS 5,704,024 A * 12/1997 Voorhies et al. ............... 395/125
5,864,639 A * 1/1999 Chao ............................. 382/293

(Continued)

FOREIGN PATENT DOCUMENTS

| JP | 2001218979 A | 8/2001 |
| JP | 2002329213 A | 11/2002 |
| WO | WO 00/55813 A | 9/2000 |
| WO | WO 03/032253 A | 4/2003 |

OTHER PUBLICATIONS

Green N: "Environment Mapping and Other Applications of World Projections" Nov. 1, 1986, IEEE Computer Graphics and Applications, IEEE Inc. New York, US, pp. 21-29, XP000002234 ISSN: 0272-1716; p. 22, right-hand column, line 3—p. 26, left-hand column, paragraph 2.

(Continued)

*Primary Examiner* — Maurice L McDowell, Jr.
(74) *Attorney, Agent, or Firm* — Lerner, David, Littenberg, Krumholz & Mentlik, LLP

(57) ABSTRACT

A method of forming a two dimensional map of a three dimensional environment, there being a map origin located in the three dimensional environment, a viewing direction vector defined passing through the map origin, and a one-to-one correspondence between map positions in the map and the directions of vectors passing through the map origin; comprises the steps of: associating an environment position in the three dimensional environment with a folded vector that passes through the map origin, the folded vector lying in a plane containing both the viewing direction vector and the environment position and forming an angle with the viewing direction vector that is a predetermined function of the angle between the viewing direction vector and a vector between the map origin and the environment position; associating an environment position with the map position corresponding to the direction of the folded vector associated with that environment position; and deriving properties for a map position from the properties of the corresponding environment position.

10 Claims, 14 Drawing Sheets

(56) References Cited

U.S. PATENT DOCUMENTS

Figure 1:
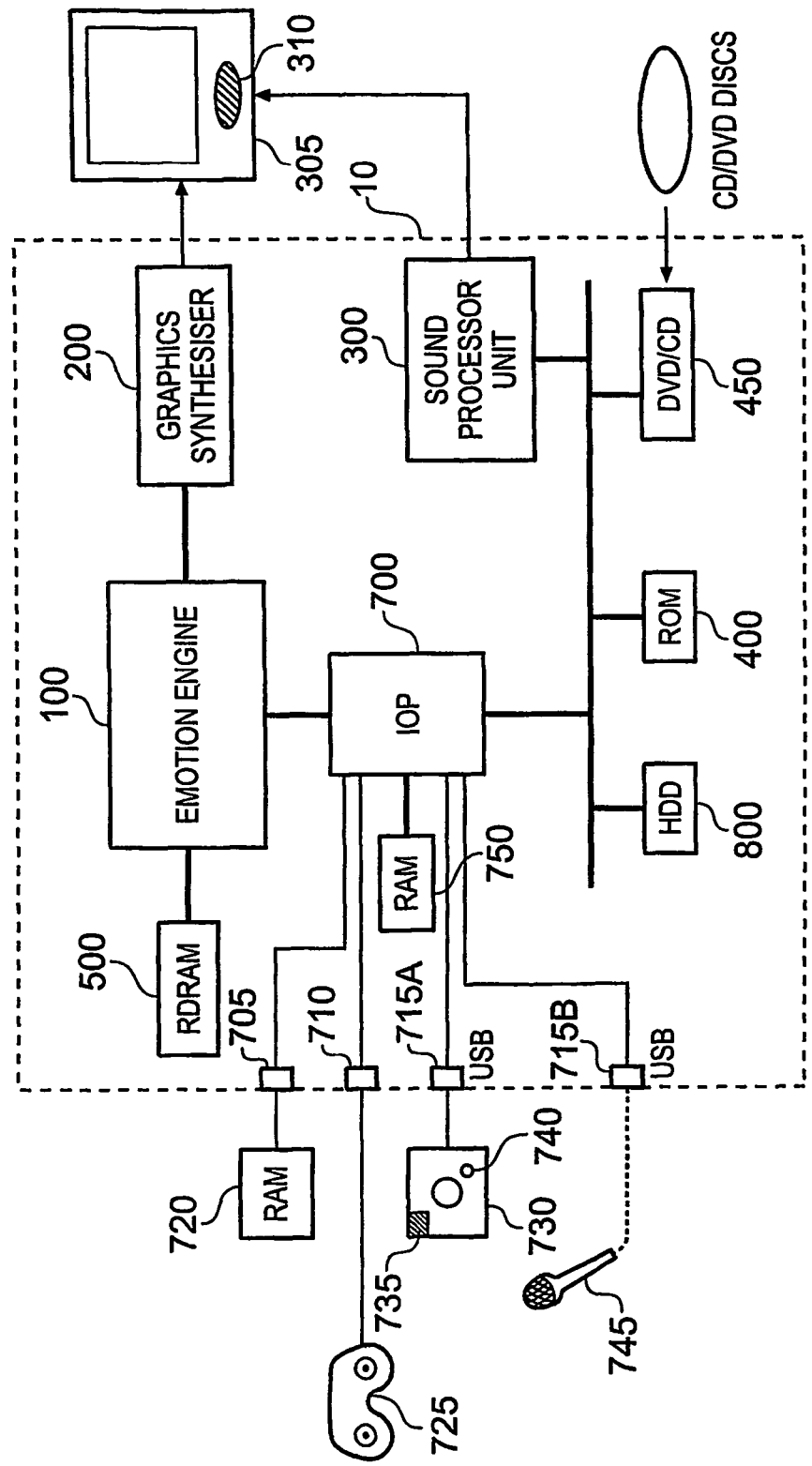

| | | | |
|---|---|---|---|
| 6,118,474 A * | 9/2000 | Nayar | 348/36 |
| 6,384,824 B1 | 5/2002 | Morgan et al. | |
| 6,624,812 B1 | 9/2003 | Collodi | |
| 6,697,062 B1 * | 2/2004 | Cabral et al. | 345/419 |
| 7,091,973 B1 * | 8/2006 | Cohen | 345/426 |
| 2003/0112238 A1 * | 6/2003 | Cerny et al. | 345/426 |
| 2003/0171840 A1 * | 9/2003 | Haupt | 700/175 |

OTHER PUBLICATIONS

Japanese Office Action for Application No. 2006-5405699 dated Apr. 7, 2010.

European Examination Report for Application No. 04798363.0 dated Jul. 7, 2011.

Wolfgang Heidrich and Hans-Peter Seidel, "View-independent Environment Maps", Computer Graphics Group, University of Erlangen, 7 sheets, 1998.

* cited by examiner

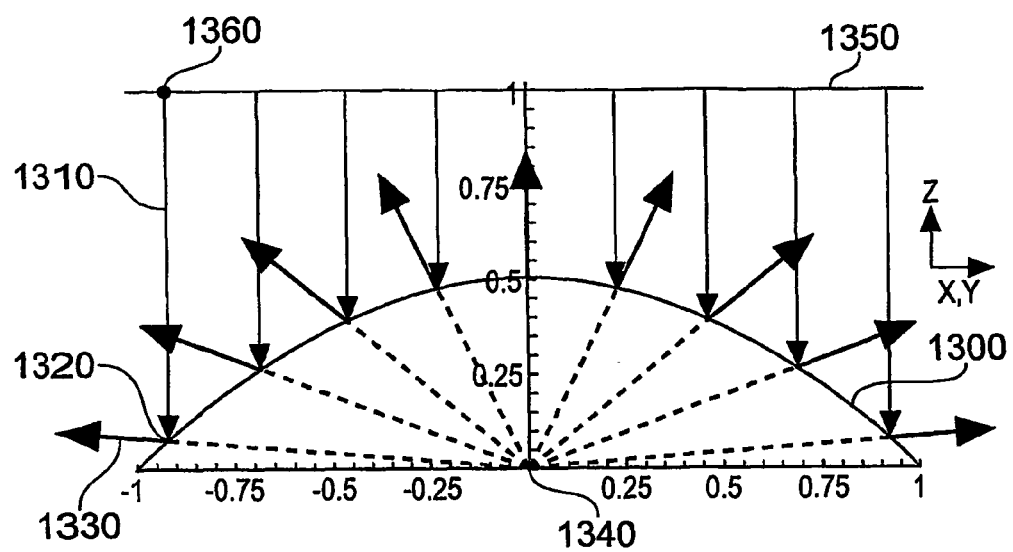
Fig. 7
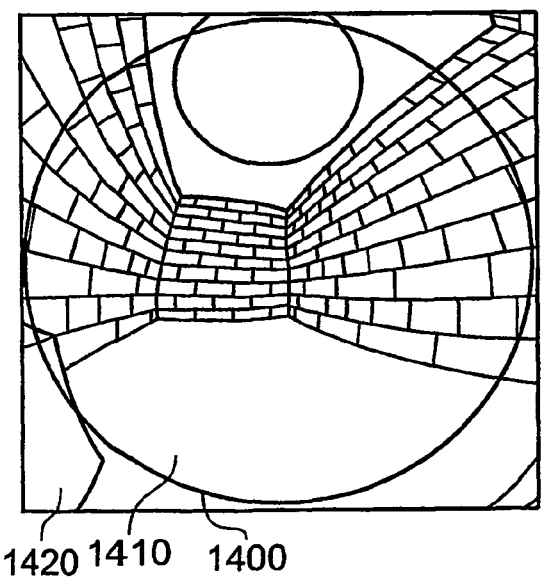 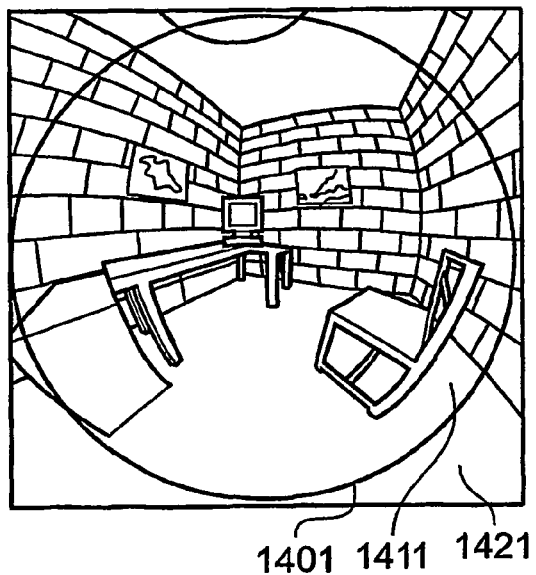
Fig. 8A  Fig. 8B

IMAGE RENDERING

This application is the National Stage of International Application No. PCT/GB2004/004632, filed Nov. 2, 2004, which claims the benefit under 35 U.S.C. 119 (a-e) of GB0327622.7 filed Nov. 27, 2003, which is herein incorporated by reference.

This invention relates to image rendering.

Many applications of image rendering use the virtual environment surrounding a displayed object to contribute to the surface appearance of the object. This generally increases the realism of the rendered object. Two examples are the use of lighting effects, so that the object varies in appearance depending on its relative position and surface orientation with respect to a light source, and the use of environmental reflections so that the object's appearance can vary in dependence on its reflectivity and surface orientation as well as its surroundings.

Three techniques have been proposed to achieve this: cube mapping, spherical mapping and dual paraboloid mapping. These techniques have some process steps in common. In particular, once a viewing direction is defined, a "reflection vector" is calculated for a small area of the surface of an object, based on the viewing direction with respect to the object and the surface normal at that position on the object. This reflection vector points to a position in a "map" of the environment which approximates to the view of the surroundings from the object's point of view. The image properties of the environment at the mapped position are then applied to the object's surface at that position. The degree to which they modify the object depends on the notional reflectivity of the object. So, having these features in common, the ways in which the techniques differ will now be briefly described.

Cube mapping uses a vector derived from the viewpoint and the surface normal to index into an environment "texture" represented by six squares arranged as the faces of a cube. The six squares therefore represent a planar projection of the environment in six orthogonal directions. A single texture representing the entire environment is formed by combining these six squares.

Spherical mapping uses a single texture map to represent the entire environment, as though a very small highly reflective sphere had been placed in the environment and photographed. Because of the simplicity of the computation, spherical environment mapping is widely used for rendering global reflections. But the map includes a singularity so that the environment in a certain direction cannot be used. This means that the viewing direction must be fixed, which is a disadvantage especially in real time systems.

Dual-Paraboloid Environment Mapping was developed by Heidrich & Seidel (Proceedings of Eurographics/SIG-GRAPH Workshop on Graphics Hardware 1998) and provides another way to apply the reflection to an object, such that the reflection can be seen in any given viewing direction. Basically the directional contributions of the environment are encoded as two maps oriented 180 degrees apart—one representing the environment in front of the object, one representing the environment behind. The main advantages of dual paraboloid mapping over spherical mapping are a better sampling of the environment, the elimination of so-called sparkle artifacts and an independence of view direction.

To use any of these mapping techniques, the environment can be pre-prepared and static. But in some applications such as, for example, a real-time representation of a car race by a computer games machine, the environment depends on the instantaneous position of the car being viewed. In this type of situation, the environment texture data in any of the above arrangements has to be derived at the time it is needed.

Deriving the environment texture data for use in any of these mapping processes is very processor-intensive. To derive the data for the cube mapping processes, a six pass process is used. For spherical mapping four passes of two major processing steps are needed. The processing requirements to generate a dual paraboloid map are twice those of the spherical map.

This invention provides a method of forming a two dimensional map of a three dimensional environment, there being a map origin located in the three dimensional environment, a viewing direction vector defined passing through the map origin, and a one-to-one correspondence between map positions in the map and the directions of vectors passing through the map origin;

the method comprising the steps of:

associating an environment position in the three dimensional environment with a folded vector that passes through the map origin, the folded vector lying in a plane containing both the viewing direction vector and the environment position and forming an angle with the viewing direction vector that is a predetermined function of the angle between the viewing direction vector and a vector between the map origin and the environment position;

associating an environment position with the map position corresponding to the direction of the folded vector associated with that environment position; and deriving properties for a map position from the properties of the corresponding environment position.

The invention provides a new technique allowing an environmental map, suitable for use in a dual paraboloid-like technique, using a single pass. For objects in the environment, a vector between the mapping origin and the object (or a position on the object) is established. The angle between that vector and a viewing direction (the viewing direction being for the purposes of producing the map) is altered—preferably being bisected—to give a folded vector. The folded vector can then be projected onto a plane to produce a map position. The image properties of the object in the environment (whether for reflection or lighting purposes) can then be applied to that map position.

The invention is particularly suited for use in video games machines. The reduced processing requirements of this technique are suitable for situations where a map has to be produced often, for example at each video frame.

The invention also provides computer software having program code for carrying out a method as above. The computer software is preferably provided by a providing medium such as a transmission medium or a storage medium.

Further respective aspects and features of the invention are defined in the appended claims.

Figure 2:
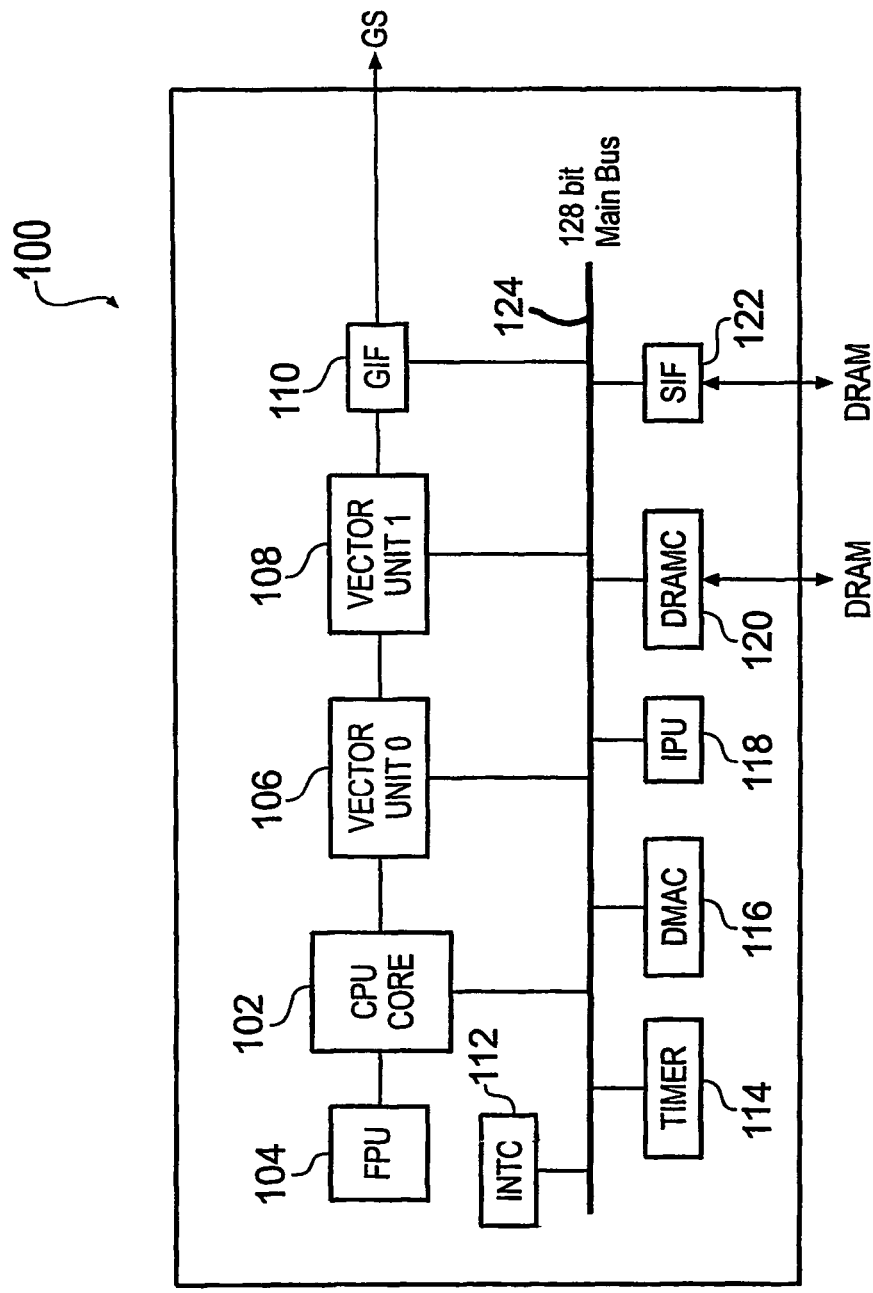
Figure 3:
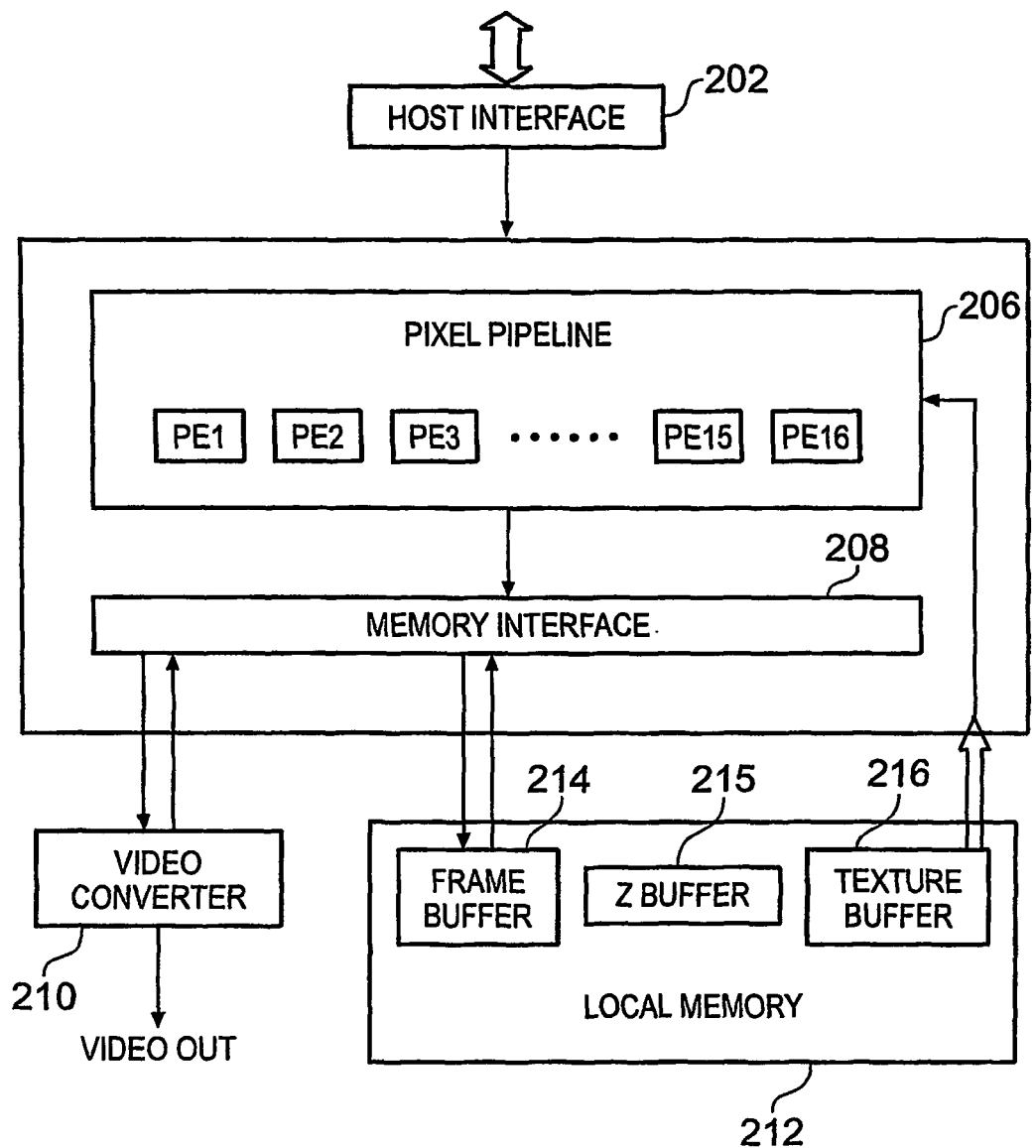
Figure 4:
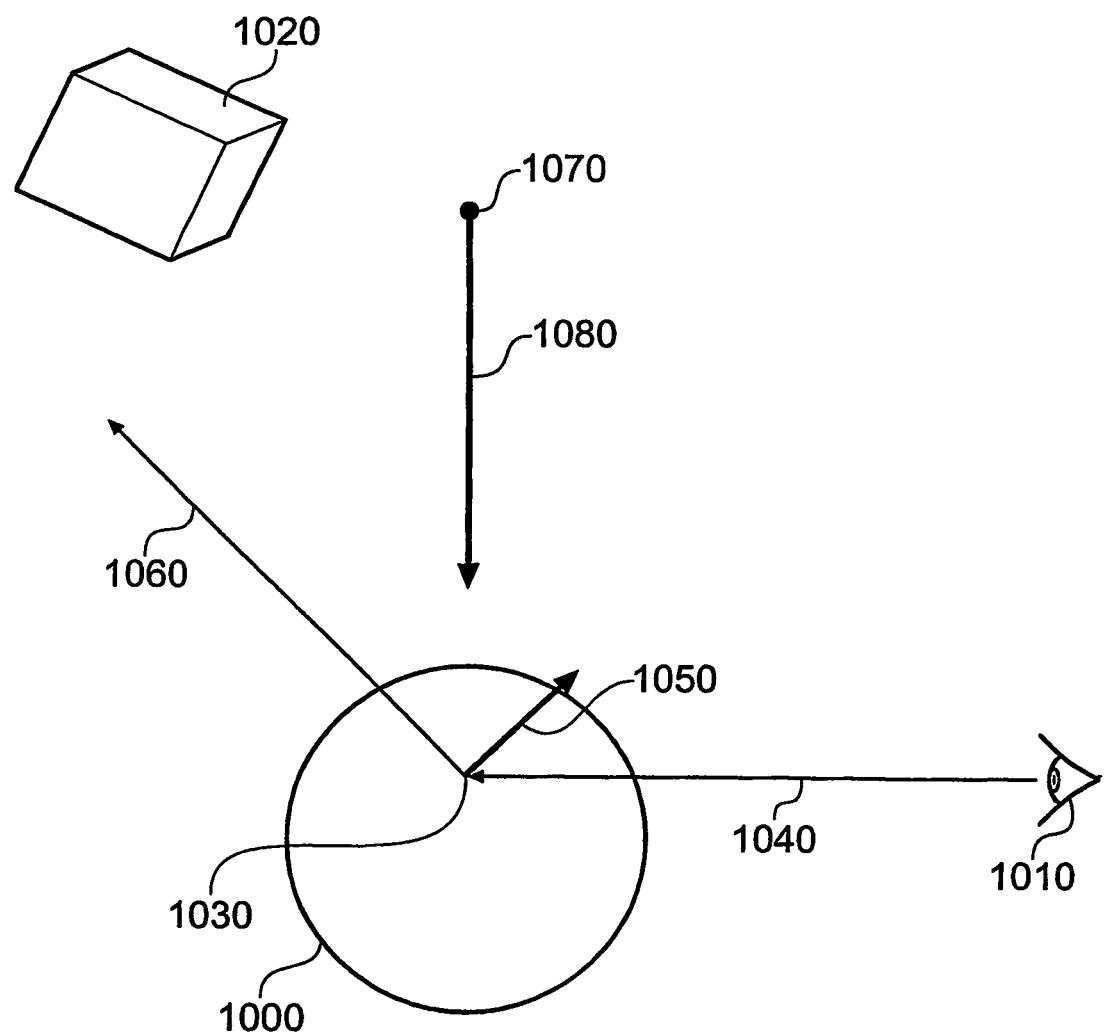
Figure 5:
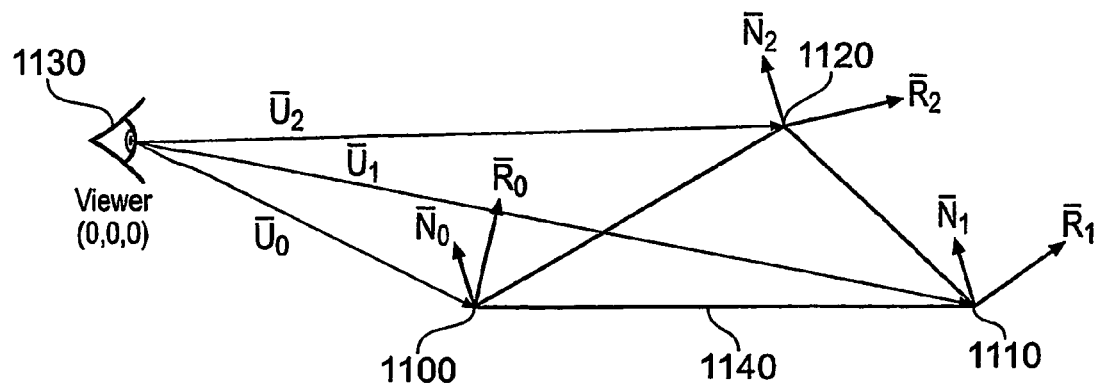
Figure 6:
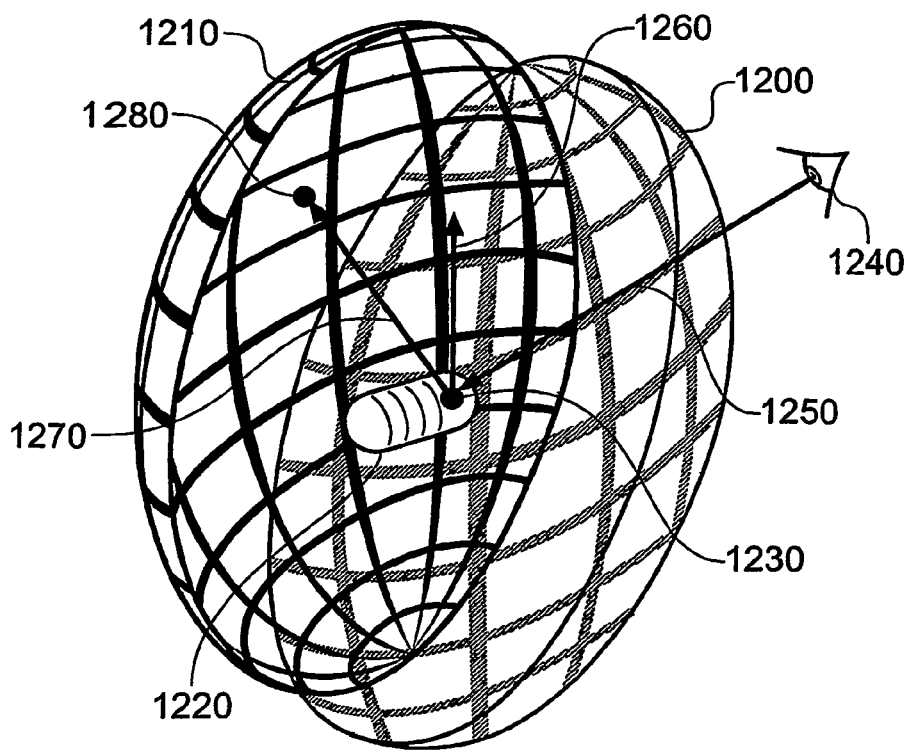
Figure 9:
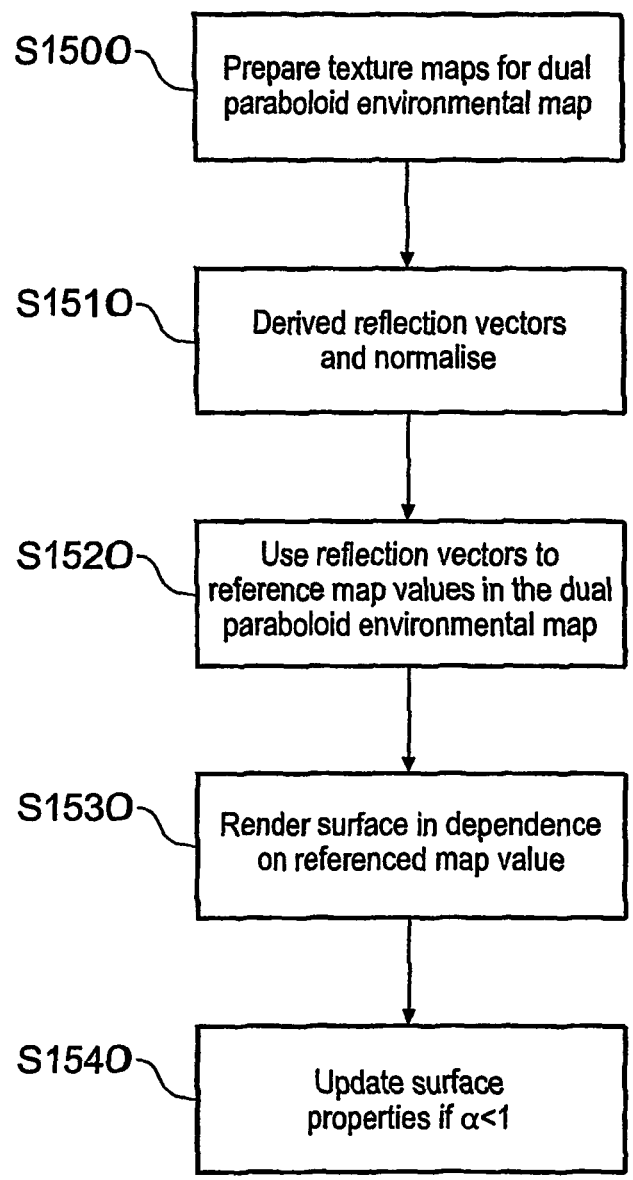
Figure 10:
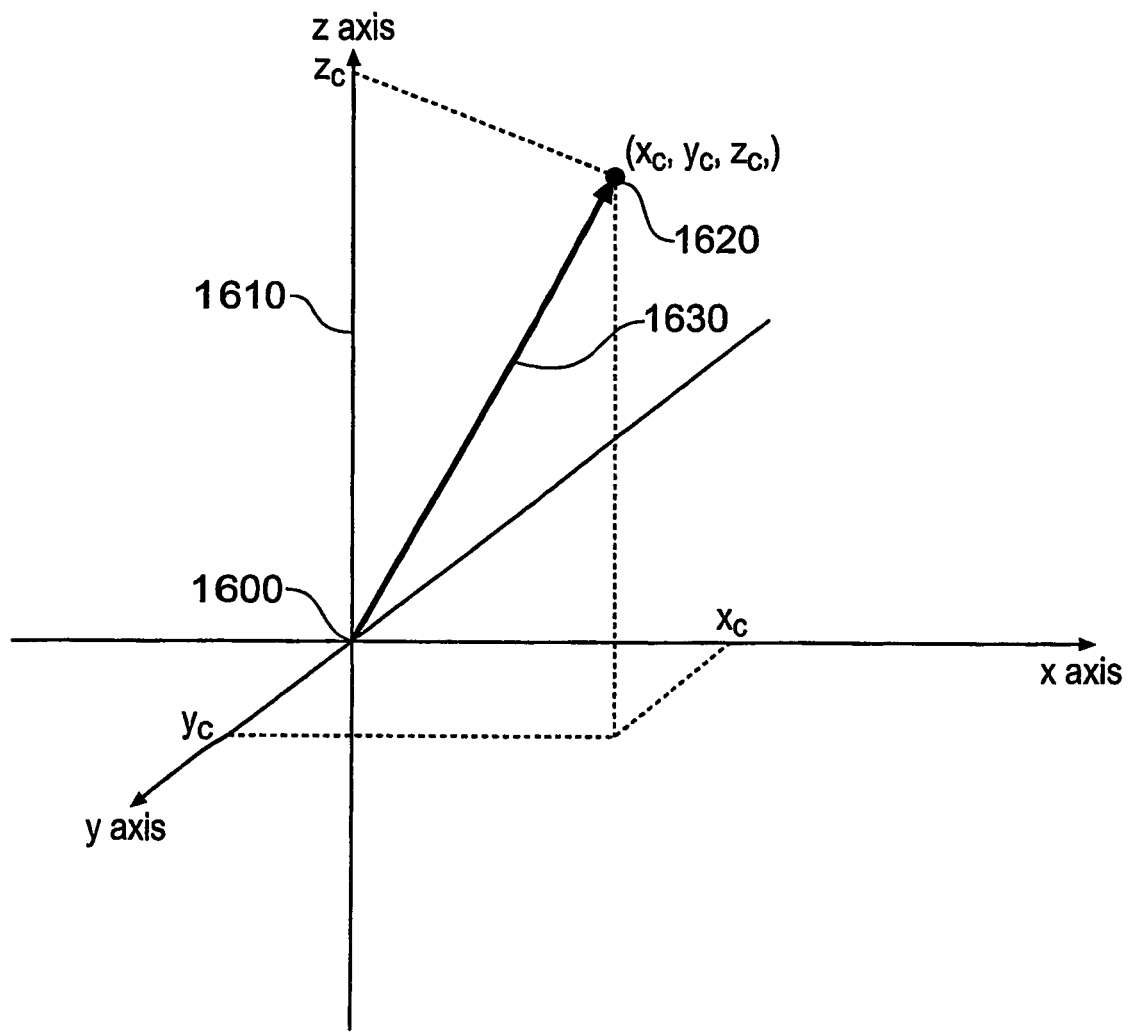
Figure 11:
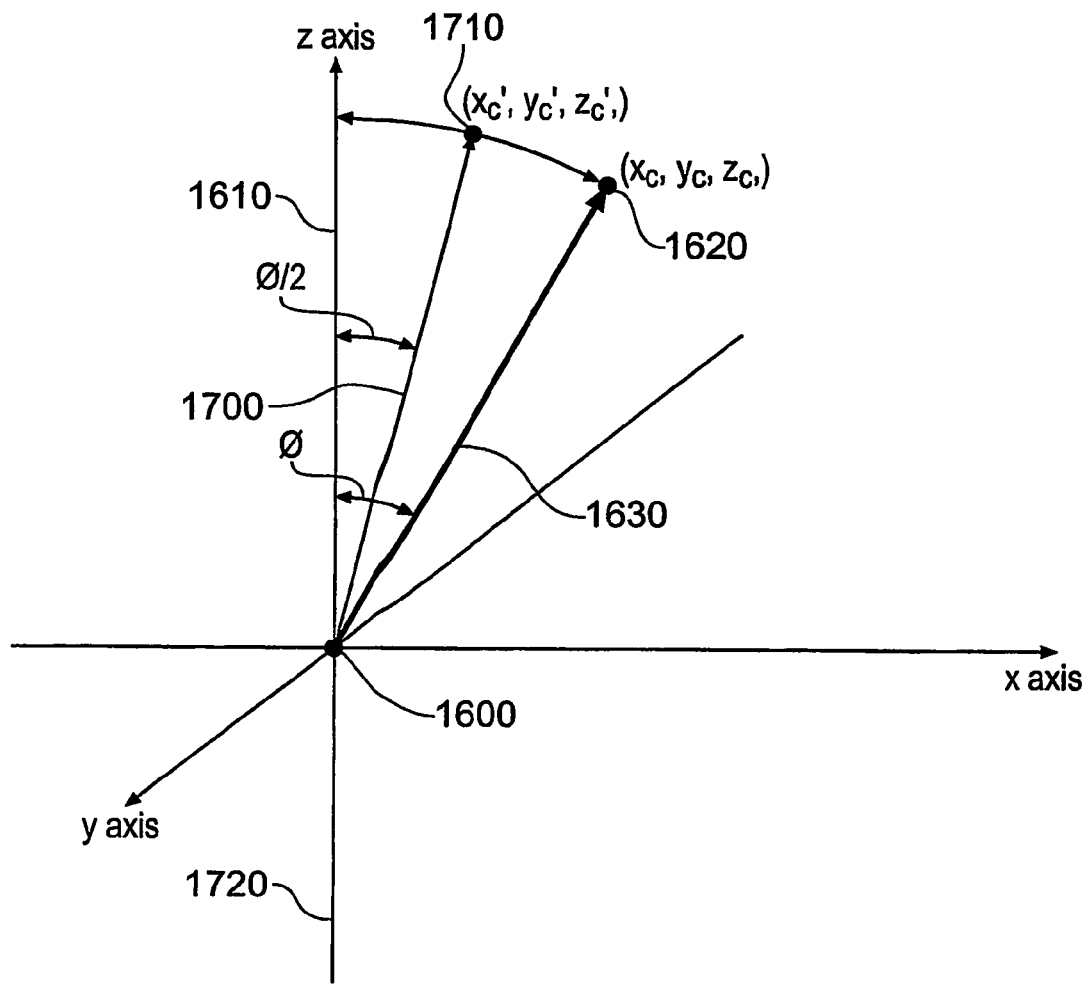
Figure 12:
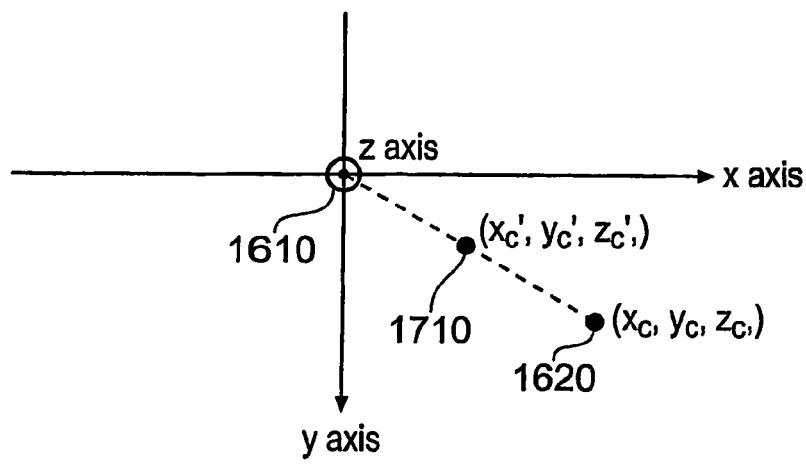
Figure 13:
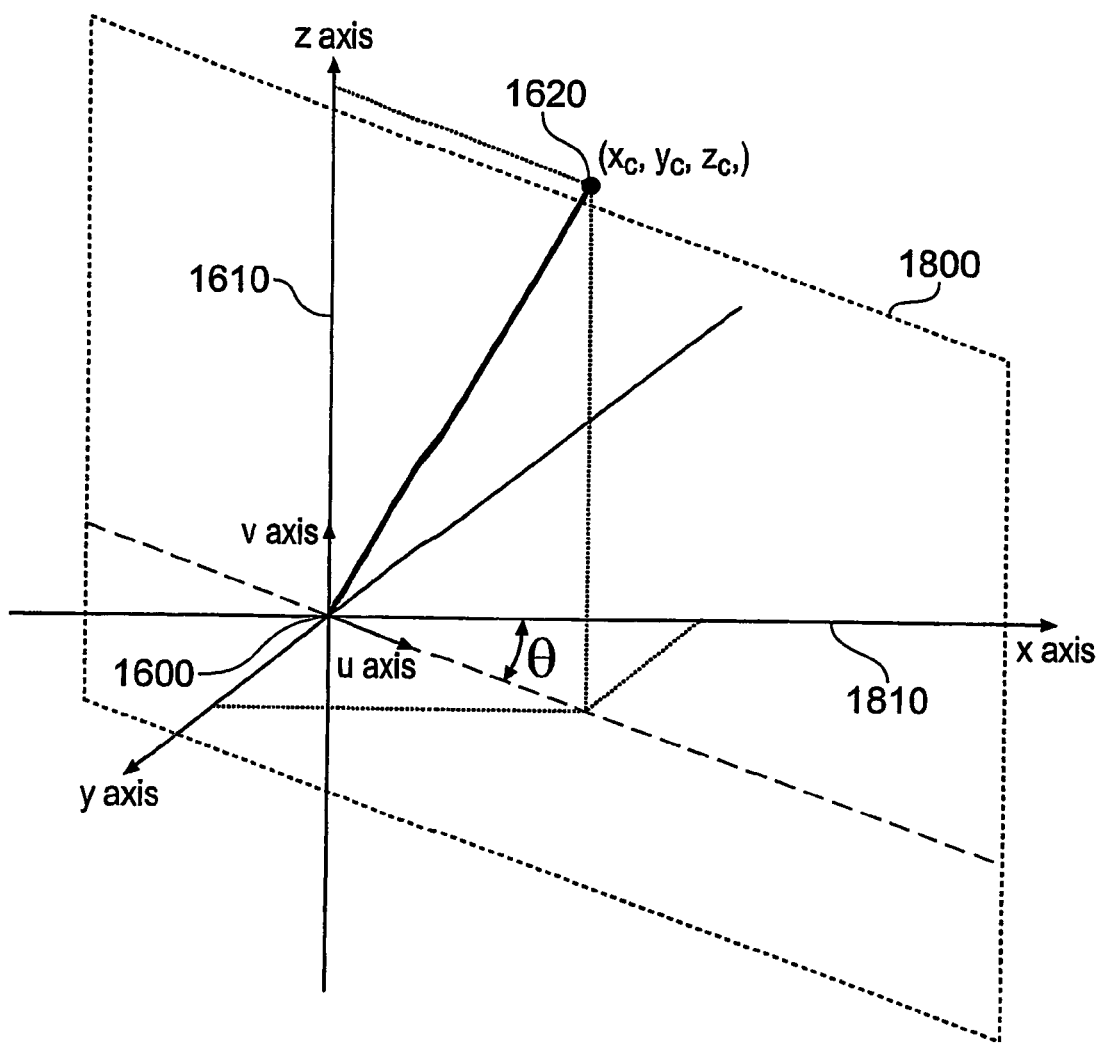
Figure 14:
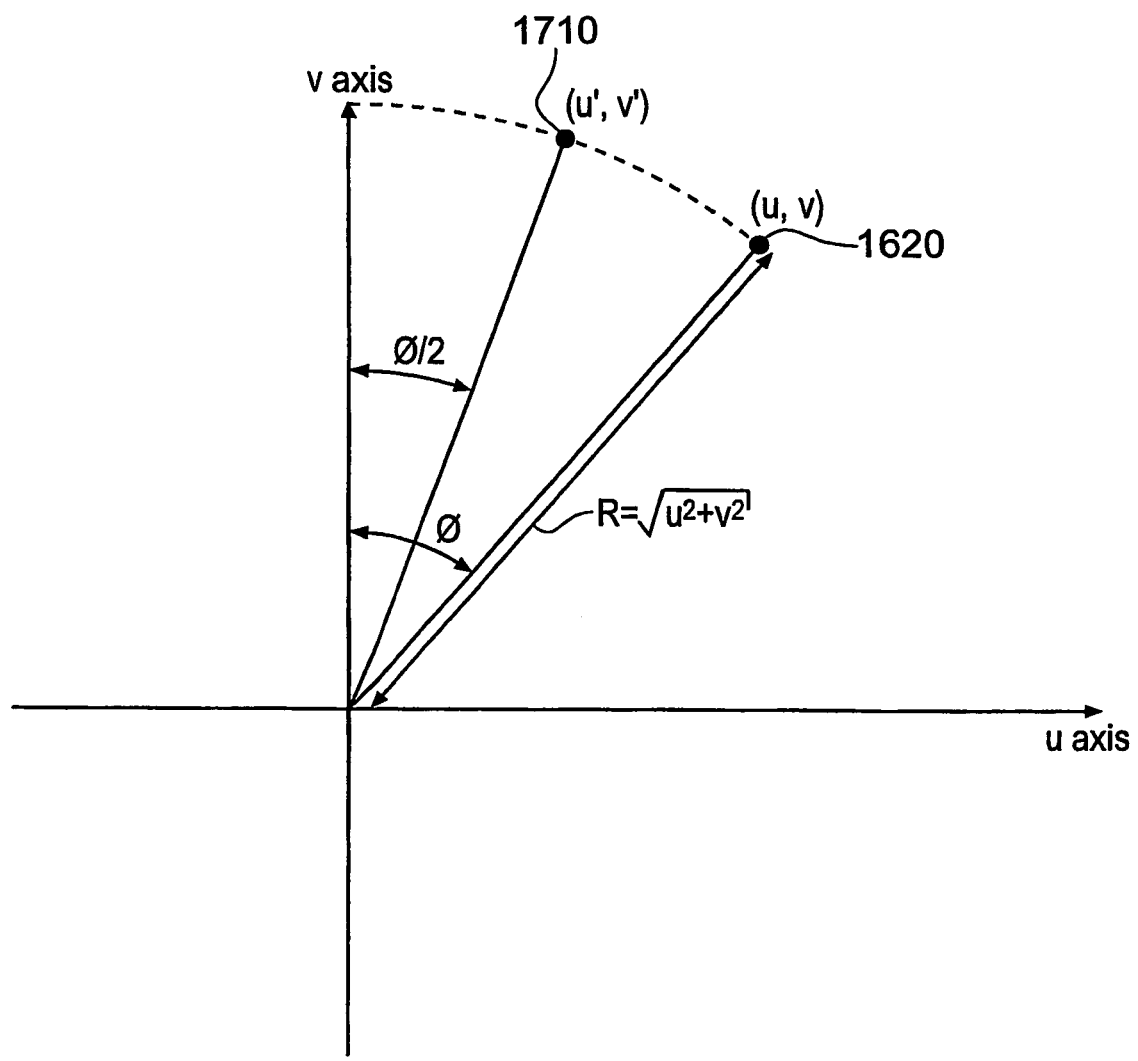
Figure 15:
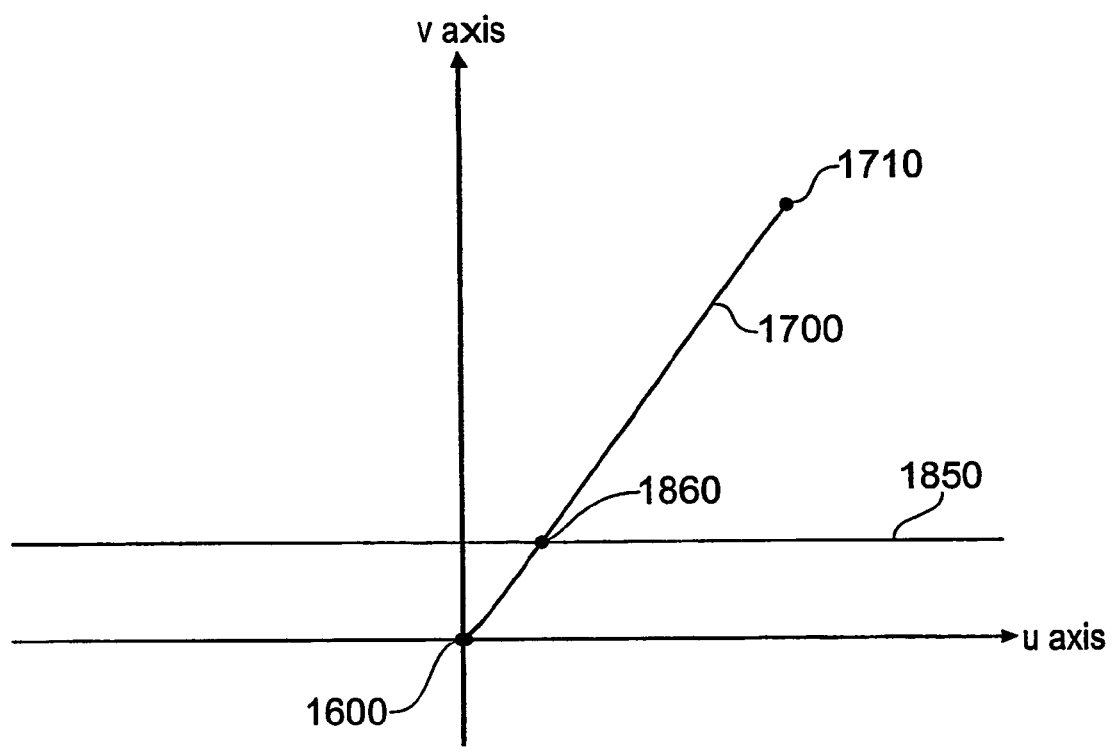
Figure 16:
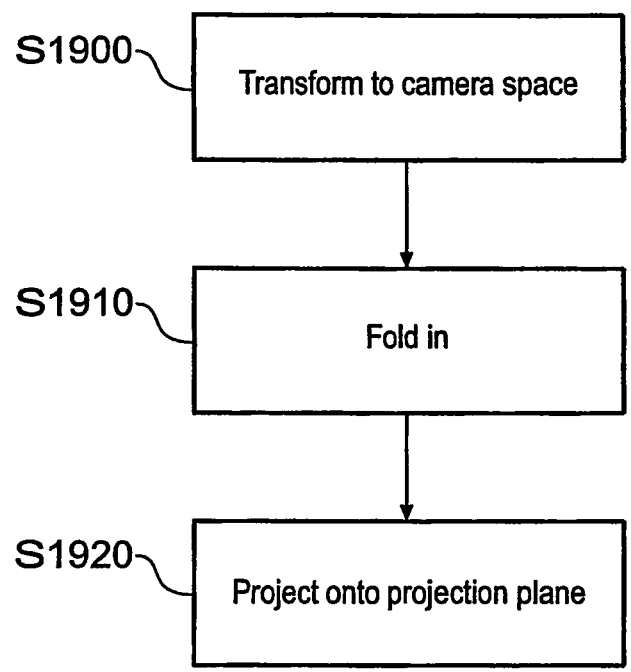
Figure 17:
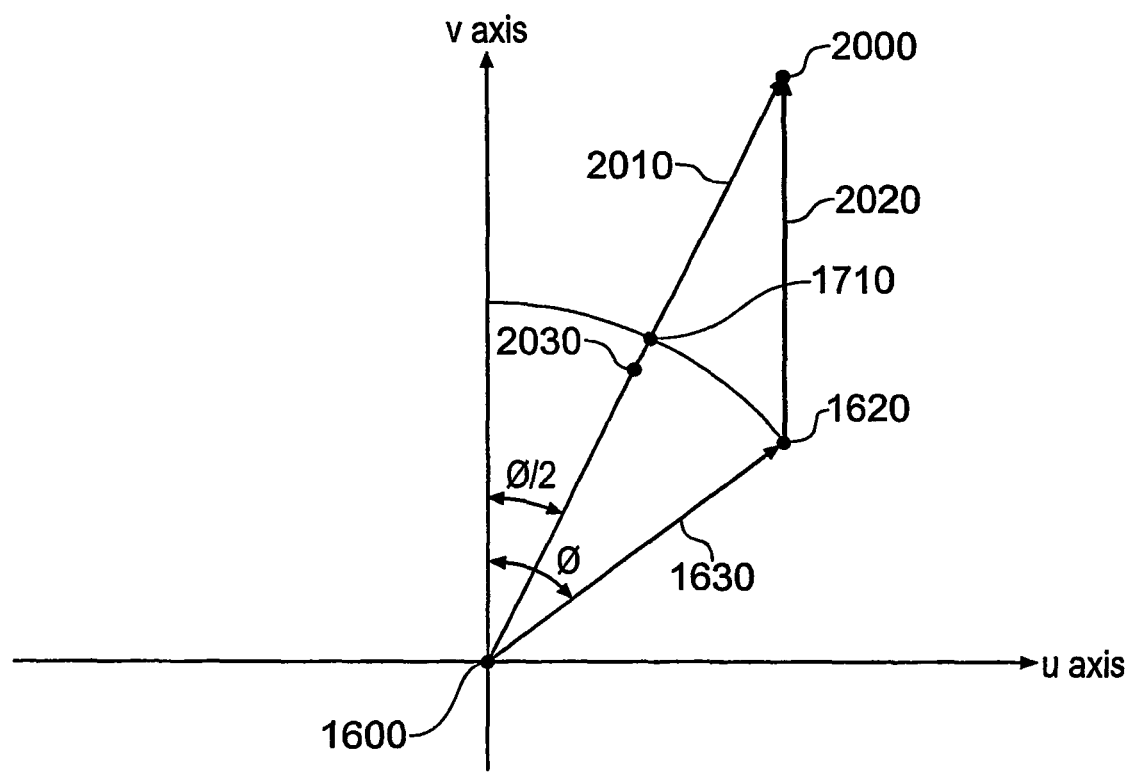

Embodiments of the invention will now be described, by way of example only, with reference to the accompanying drawings in which:

FIG. 1 schematically illustrates the overall system architecture of the PlayStation2;

FIG. 2 schematically illustrates the architecture of an Emotion Engine;

FIG. 3 schematically illustrates the configuration of a Graphic synthesiser;

FIG. 4 schematically illustrates an environmental mapping process;

FIG. 5 schematically illustrates the generation of reflection vectors in respect of three object points;

FIG. 6 schematically illustrates a pair of texture maps for a dual paraboloid map;

FIG. 7 schematically illustrates the derivation of a dual paraboloid map;

FIGS. 8a and 8b schematically illustrate two example maps;

FIG. 9 is a flowchart summarising a mapping process;

FIG. 10 schematically illustrates a coordinate system;

FIG. 11 schematically illustrates a folding process;

FIG. 12 is a schematic projection of FIG. 12 into the x-y plane;

FIG. 13 schematically illustrates a rotation of coordinate axes;

FIG. 14 schematically illustrates a folding process as applied to a rotated coordinate system;

FIG. 15 schematically illustrates a method of projecting a point onto a projection plane;

FIG. 16 is a flowchart summarising the generation of a texture map using the folding process for a point in the 3D environment; and FIG. 17 schematically illustrates an alternative folding process as applied to a rotated coordinate system.

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; and an input/output processor (IOP) 700 with dedicated RAM 750. An (optional) external hard disk drive (HDD) 800 may be connected.

The input/output processor 700 has two Universal Serial Bus (USB) ports 715A and 715B and an iLink or IEEE 1394 port (iLink is the Sony Corporation implementation of IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, set-top boxes, printers, keyboard, mouse and joystick.

Generally, in order for successful data communication to occur with a peripheral device connected to a USB port 715A or 715B, an appropriate piece of software such as a device driver should be provided. Device driver technology is very well known and will not be described in detail here, except to say that the skilled man will be aware that a device driver or similar software interface may be required in the embodiment described here.

In the present embodiment, a video camera 730 with an associated microphone 735 and an LED indicator 740 is connected to the USB port 715A. Although various types of video camera may be used, a particularly suitable type of video camera 735 is a so-called "webcam", that is, a medium-resolution camera based on a single charge-coupled device (CCD) element and including a basic hardware-based real-time data compression and encoding arrangement, so that compressed video and audio data are transmitted by the camera 730 to the USB port 715A in an appropriate format, such as an intra-image based MPEG (Motion Picture Expert Group) standard, for decoding at the PlayStation 2 system unit 10.

The camera LED indicator 740 is arranged to receive control data via the USB data connection to the system unit 10. The CPU can send a control signal via this route to set the LED to an "off" mode, a "steady on" mode and a "flashing" mode in which the LED flashes at a rate of between, say, 1 and 3 flashes per second. The logic required to cause the LED to flash is provided in the camera circuitry, so it is not necessary for the system unit 10 to instruct each individual flash of the LED.

In an alternative embodiment of the invention, rather than using a microphone built into the webcam, a stand-alone microphone 745 is provided. A stand-alone microphone may be placed closer to a user than a built in webcam microphone, thus providing improved quality sound input to the system. Where a stand-alone microphone is provided, it can be coupled to the system via a second USB port 715B.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which coordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTSO®) sound and AC-3 (also known as Dolby Digital) which is the sound format used for digital versatile disks (DVDs).

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 118; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FD). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing microprograms and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at $1/16$ or $1/256$ intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

FIG. 3 schematically illustrates the configuration of the Graphic Synthesiser 200. The Graphics Synthesiser comprises: a host interface 202; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending (as explained below) and determines the final drawing colour based on the calculated pixel information.

The pixel pipeline 206 comprises 16 pixel engines PE1, PE2 ... PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

FIG. 4 schematically illustrates an environmental mapping process. An object 1000 lies within a virtual 3D environment generated by the game being played. In this example, it represents a reflective sphere, but it could be taken to represent any object with a reflective or at least partially reflective surface, such as a car bonnet or a teapot. The object 1000 is to be rendered as if viewed from a viewing position 1010. As the object 1000 has a reflective surface, the rendering involves calculating the reflections of the environment off the object 1000 as seen from the viewing position 1010. These reflections are dependent on the environment, the topology of the object 1000 and the location of the object 1000 and the view position 1010 within the environment. For example, a cube 1020 also exists within the environment and may or may not be seen from the viewing position 1010 as a reflection off the object 1000 depending on the relative locations of the object 1000, the cube 1020 and the viewing position 1010.

To calculate the appearance, as seen from the viewing position 1010, of a surface point 1030 located on the surface of the object 1000, a viewing vector 1040 from the viewing position 1010 to the surface point 1030 is calculated. This can be normalised to form a vector $\overline{U}$ of unit length. A normal vector 1050 is shown that represents the normal to the surface of the object 1000 at the surface point 1030. This can be normalised to form a vector $\overline{N}$ of unit length. A reflection vector 1060 can be calculated from $\overline{N}$ and $\overline{U}$ using Equation 1 below:

$$\overline{R} = \overline{U} - 2(\overline{U} \cdot \overline{N})\overline{U} \quad \text{Equation 1:}$$

The reflection vector 1060 points to the position in the environment that would be seen from the viewing position 1010 as a reflection at the surface point 1030 off the surface of the object 1000.

Whilst these vectors could be calculated within any coordinate system, it is common to use a coordinate system with the viewing position 1010 located at the origin.

In an environmental mapping process, the reflection vector 1060 is used to index a point in a texture map. A texture map is a 2D representation of the 3D environment as seen from a particular mapping-point located within the environment and viewed in a particular direction. This mapping-point may or may not be the same as the surface point 1030. The generation of texture maps will be described later. As the texture map is generated from the mapping-point facing in a particular direction, some sections of the texture map may relate to the environment in front of the mapping-point whilst others may relate to the environment behind the mapping-point. An example mapping point 1070 and an example viewing direction 1080 are shown in FIG. 4.

FIG. 5 schematically illustrates the generation of three reflection vectors, $\overline{R_0}$, $\overline{R_1}$ and $\overline{R_2}$ in respect of three surface points 1100, 1110 and 1120 given a viewing position 1130. The three reflection vectors $\overline{R_0}$, $\overline{R_1}$ and $\overline{R_2}$ are calculated according to Equation 1, using normalised versions of three viewing vectors $\overline{U_0}$, $\overline{U_1}$ and $\overline{U_2}$ and three unit normal vectors $\overline{N_0}$, $\overline{N_1}$ and $\overline{N_2}$ respectively. A reflection vector could be calculated in a similar manner for any other surface point. Alternatively, if a relatively flat surface topology is assumed within a triangle 1140, formed from the three surface points 1100, 1110 and 1120, then the reflection vector for a point within the triangle 1140 could be calculated by interpolating the three reflection vectors $\overline{R_0}$, $\overline{R_1}$ and $\overline{R_2}$.

FIG. 6 schematically illustrates a forwards-facing texture map 1200 and a backwards-facing texture map 1210 for a dual paraboloid environmental mapping process. The generation of this pair of texture maps will be described later. However, it is important to note that they form a 2D projection of the 3D environment. The forwards-facing texture map 1200 stores information about the 3D environment in front of a particular mapping-point within the environment whilst the backwards-facing texture map 1210 stores information about the 3D environment behind the mapping-point. Together, they store information about the whole environment.

An object 1220 exists within the virtual 3D environment generated by the game and has a reflective or at least partially reflective surface. To calculate the appearance, as seen from a viewing position 1240, of a surface point 1230 located on the surface of the object 1220, a viewing vector 1250 from the viewing position 1240 to the surface point 1230 is calculated. This can be normalised to form a vector $\overline{U}$ of unit length. A normal vector 1260 represents the normal to the surface of the object 1220 at the surface point 1230. This can be normalised to form a vector $\overline{N}$ of unit length. A reflection vector 1270 can be calculated from $\overline{N}$ and $\overline{U}$ using Equation 1. The reflection vector 1270 points to a position 1280 in the environment that would be seen from the viewing position 1240 as a reflection at the surface point 1230 off the surface of the object 1220.

FIG. 7 schematically illustrates the derivation of a dual paraboloid environmental map. The figure shows a 2D cross-section of the surface of a paraboloid 1300. The paraboloid 1300 has equation $$z = \frac{1}{2} - \frac{1}{2}(x^2 + y^2),$$

which has the property that a ray of light 1310 running parallel to the z-axis and incident on the surface of the paraboloid 1300 at a surface point 1320 will be reflected in a reflection direction 1330, the reflected light appearing to have originated at the origin 1340 of the paraboloid 1300.

To derive a forwards-facing 2D texture map 1350 of the dual paraboloid environmental map, the paraboloid 1300 is assumed to be located with the origin 1340 at the desired mapping-point and with the positive z-axis in the desired viewing direction. A sample 1360 within the texture map 1350 assumes the properties taken by the place in the environment to which the associated reflection direction 1330 points. A backwards-facing 2D texture map can be derived in a similar manner, except with the z-axis in the opposite direction.

Although FIG. 7 illustrates a single 2D cross-section of the surface of the paraboloid 1300 and an associated one dimensional portion of the texture map 1350, it will be appreciated that all possible similar cross-sections can be used to sample the entire 3D environment, thereby forming a 2D texture map.

FIGS. 8a and 8b schematically illustrate a forwards-facing and a backwards-facing texture map respectively. Together, they form a dual paraboloid environmental mapping. Samples that lie on the circles 1400 and 1401 represent points in the environment that lie in the plane orthogonal to the viewing direction and containing the mapping-point, i.e. they represent points in the environment pointed to when the reflection direction 1330 is perpendicular to the viewing direction. The samples 1410 that lie within the circle 1400 represent points in the environment that are in front of the mapping-point. The samples 1411 that lie within the circle 1401 represent points in the environment that are behind the mapping point. It will be appreciated that it is possible to reference any point in the environment using only the samples on the circles 1400 and 1401 and the samples 1410 and 1411 within the circles 1400 and 1401. However, the samples 1420 that lie outside the circle 1400 and that represent points behind the mapping-point can be used in conjunction with the backwards-facing texture map to create a more accurate rendering of a point behind the mapping-point. Similarly, the samples 1421 that lie outside the circle 1401 and that represent points in front of the mapping-point can be using in conjunction with the forwards-facing texture map to create a more accurate rendering of a point in front of the mapping-point. In this way, it will be appreciated that the forwards-facing and backwards-facing texture maps of FIGS. 8a and 8b respectively overlap in respect of the area of the 3D environment that they represent.

FIG. 9 is a flowchart summarising a mapping process. At a step S1500, the forwards-facing and backwards-facing texture maps are prepared for the dual paraboloid environmental map according to the methods already described. Preferably, this is done so that the mapping-point is located within the reflective object that is to be rendered.

At a step S1510, the relevant normalised reflection vectors are calculated. This is performed for each sample on the surface of the reflective object that is to be rendered. The calculation of the reflection vectors depends on the specific viewing point, the location of the reflective object and the topology of the reflective object.

At a step S1520, the reflection vectors are used to reference map-values in the dual paraboloid environmental map. It is possible for a reflection vector to reference more than one map-value in the environmental map if, for example, the reflection vector were to point to a point in the map with non-integer coordinates. Alternatively, as has been described, there is a degree of overlap between the forwards-facing and backwards-facing texture maps, so it is possible for the reflection vector to reference a map-value in both texture maps.

At a step S1530, the surface of the reflective object is rendered in accordance with the map-values referenced at the step S1520. If an individual reflection vector referenced more than one map-value in the dual paraboloid environmental map, then the rendering could use, for example, some form of interpolation to derive the actual value to be used in rendering the corresponding surface point.

At a step S1540, the alpha-values of the points on the surface of the reflective object are taken into consideration. The alpha-value at a point specifies the degree of opacity at that point. The alpha-value ranges from zero to one, with one indicating completely opaque and zero indicating completely transparent. If the alpha-value of a given surface point is less than one (i.e. not completely opaque), then a portion of the 3D environment behind the object can be seen through the object at that point. This portion of the 3D environment can be referenced in the dual paraboloid environmental map using the direction of the vector from the viewing position to the surface point. The properties of the rendered surface point can then be updated. A skilled man will appreciate that this could be achieved, for example, by alpha-blending, in which the properties of the surface point are calculated as a relative proportion of the properties the two points in the 3D environment, namely the point seen as a reflection at the surface and the point seen through the object. This relative proportion is dependent on the alpha-value of the surface point.

FIG. 10 schematically illustrates a coordinate system for generating an environmental texture map. The origin is positioned at a mapping-point 1600. Preferably, the mapping-point 1600 is located within the reflective object that is to be rendered, but this is not essential. The coordinate system has a positive z-axis 1610 in the viewing direction from the mapping-point 1600. An environment point 1620 with coordinates $(x_c, y_c, z_c)$ lies in the environment. Associated with the environment point 1620 is a position vector 1630, which is the vector from the origin 1600 to the environment point 1620. A method for generating a texture map will now be described.

FIG. 11 schematically illustrates a so-called folding process. The position vector 1630 makes an angle φ with the z-axis 1610. A folded vector 1700 is the vector from the origin 1600 that lies in the same plane as the position vector 1630 and the z-axis 1610, but that makes an angle of φ/2 with the z-axis 1610 towards the position vector 1630. The position vector 1630 and the folded vector 1700 have the same length. A folded point 1710 at the end of the folded vector 1700 has coordinates $(x'_c, y'_c, z'_c)$. The environment point 1620 may be said to have been folded to the folded point 1710.

FIG. 12 is a schematic projection of FIG. 11 onto the x-y plane. As can be seen from FIG. 12, a line through the folded point 1710 and environment point 1620 intersects the z-axis 1610, i.e. when the environment point 1620 is folded to the folded point 1710, the folding process moves the environment point 1620 directly towards the z-axis 1610. A method of calculating the folded point will now be described.

FIG. 13 schematically represents a rotation of coordinate axes. A plane 1800 is the plane through the z-axis 1610 that contains the environment point 1620. The plane 1800 makes an angle θ with the x-axis 1810. For the environment point 1620, the folding process occurs within the plane 1800. To make the calculations easier, the coordinate axes can be rotated around the z-axis 1610 so that the rotated x-axis lies within the plane 1800.

For any point (x,y,z) in the original coordinate system, the coordinates with respect to the rotated axes are (x',y',z') where $$(x', y', z') = (x, y, z)\begin{pmatrix} \cos\theta & -\sin\theta & 0 \\ \sin\theta & \cos\theta & 0 \\ 0 & 0 & 1 \end{pmatrix}$$

$$= (x\cos\theta + y\sin\theta, y\cos\theta - x\sin\theta, z).$$

In the situation shown in FIG. 13, $$\sin\theta = \frac{y_c}{\sqrt{x_c^2 + y_c^2}} \text{ and } \cos\theta = \frac{x_c}{\sqrt{x_c^2 + y_c^2}}.$$

Using these values for sin θ and cos θ together with the rotation matrix, the coordinates of the environment point 1620 in the rotated coordinate space are ($\sqrt{x_c^2+y_c^2}$,0,$z_c$), so that the coordinates of the environment point 1620 in the u-v axes of the plane 1800 are (u,v)=($\sqrt{x_c^2+y_c^2}$, $z_c$).

FIG. 14 schematically illustrates a folding process as applied to a rotated coordinate system, the folding occurring within the plane 1800. Applying standard trigonometric identities, the environment point 1620 is folded to the folded point 1710 that has coordinates $$(u', v') = \left(R\sin\frac{\phi}{2}, R\cos\frac{\phi}{2}\right) = \left(R\sqrt{\frac{1-\cos\phi}{2}}, R\sqrt{\frac{1+\cos\phi}{2}}\right)$$

where $R=\sqrt{u^2+v^2}$.
As $$\cos\phi = \frac{v}{R}$$

and v=$z_c$ it follows that $$(u', v') = \left(\sqrt{\frac{(u^2+v^2)(1-\cos\phi)}{2}}, \sqrt{\frac{(u^2+v^2)(1+\cos\phi)}{2}}\right)$$

$$= \left(\sqrt{\frac{R^2 - z_c R}{2}}, \sqrt{\frac{R^2 + z_c R}{2}}\right).$$

To determine the coordinates (x',y',z') of the folded point 1710 in the original non-rotated coordinate system, all that remains is to rotate the point (u',0,v') through an angle of −θ about the z-axis 1610, using the rotation matrix.

FIG. 15 schematically illustrates a method of projecting a point onto a projection plane 1850. The v-axis (or viewing direction) is normal to the projection plane 1850. The projection plane 1850 represents the maximum field of view that a camera placed at the origin 1600 can see. The projection plane 1850 is therefore in front of the viewing point (or origin 1600) when facing in the viewing direction (or v-axis).

The folded point 1710 is projected onto a projected point 1860 in the projection plane 1850. The projected point 1860 lies at the intersection of the folded vector 1700 and the projection plane 1850.

Note that FIG. 15 illustrates a well-known method of projecting a point onto a projection plane, but as applied to the folded point 1710.

The present embodiment creates a forwards-facing texture map for an environmental mapping by forming the texture map from projected points 1860 corresponding to folded points 1710, i.e. by attributing the properties of an environment point 1620 to the projection point 1860 that is associated with the folded point 1710 for that environment point 1620. This may be done for all environment points 1620 for which $z_c \geq 0$, so that the entire environment in front of the mapping-point 1600 is represented. However, it would also be possible to represent regions of the environment behind the mapping-point 1600 in the forwards-facing texture map (in a similar manner as for the texture maps described already). A backwards-facing texture map can be created too in a similar manner.

The texture maps generated may be resized if necessary, for example to accommodate any existing hardware or software processes that use such texture maps and have requisite dimensions for the input texture maps.

Current methods of creating a texture map for a dual paraboloid environmental map involve a first step of generating four images. These images are the views of the 3D environment as would be seen through four cameras located at specific locations and directed in specific directions. The final texture map is created in a process that combines the four images, each of the four images supplying a quarter of the data required for the texture map. The present embodiment, on the other hand, does not require four such capture passes or a final combination process. Instead, each point in the texture map simply corresponds to a folded point which itself corresponds to a point in the environment. This greatly reduces the amount of processing required to generate the texture map.

In some environments, there are no objects nearby and the environment can be considered, to all intents and purposes, at infinity. As such, only one environmental map needs to be created, provided, of course that the environment does not change. However, it is often a case in game play that objects in the environment can be close to the reflective object. For realistic rendering of the reflective surface, a new environmental map needs to be created more frequently, for example on a frame by frame basis. Similarly, if the environment is constantly changing, the environmental map needs to be continuously updated. It is important, therefore, that the generation of texture maps is performed as efficiently as possible. Generation of texture maps according to the present embodiment requires less processing than previous generation methods.

In one embodiment, the texture map is initialised with an initial texture, for example with a sky texture. For each object that lies within the 3D environment, the corresponding positions within the texture map are updated according to the properties of the object. In an alternative embodiment, for each sample of the texture map the corresponding point in the environment is identified and the properties of the texture map sample are derived from the corresponding point in the environment.

FIG. 16 is a flowchart summarising the generation of a texture map using the folding process for a point in the 3D environment. At a step S1900, the point in the environment that is to be folded is transformed from the coordinate system of the environment into the coordinate system of "camera-space", which is the coordinate system established as in FIG. 7, with the origin at the mapping point and the positive z-axis in the viewing direction.

At a step S1910, the environment point is folded towards the viewing direction.

At a step S1920, the folded point is projected onto a projection plane to form the texture map.

The steps S1900, S1910 and S1920 can be use during the steps S1500 and S1520 of the flowchart of FIG. 9 that involve the generation of the texture maps and determination of referenced map values. All of the remaining steps of the flowchart of FIG. 9 can remain unaffected.

FIG. 17 schematically illustrates an alternative folding process as applied to a rotated coordinate system. In this alternative folding process, the environment point 1620 (with the position vector 1630) is to be folded towards the v-axis of the rotated coordinate system. If the length of the position vector 1630 is l, then a first folded point 2000 has a folded vector 2010 that is the sum of the position vector 1630 and a vector 2020 of length l parallel to the v-axis. By standard trigonometry, if the angle between the v-axis and the position vector 1630 is $\phi$, then the angle between the v-axis and the folded vector 2010 is $\phi/2$.

It is possible to use a point 2030 half way along the folded vector 2010 as an approximation of the folded point 1710. However, there is no essential difference between using the point 2030 or the folded point 2000 as the only difference is a scaling factor (which could be viewed as scaling the environment and changing the settings of the camera located at the origin 1600).

In practice, it has been found that using this method of calculating folded points is an improvement on the previously described method of calculating folded points. The improvements are in terms of:

(a) picture quality of 3D environments rendered using texture maps generated with the folding process and (b) efficiency, as the second method only involves the calculation of a length and the addition of a two vectors, whereas the first method involves the more complex calculations of trigonometric functions.

Whilst reflective objects that reflect the entire environment in which they are located have been considered, a skilled man will appreciate that the same methods can be used to render a reflective object when a light source is incident upon it, the appearance of the object varying in dependence on the relative positions of the light source and the object, and the surface topology of the object.

In so far as the embodiments of the invention described above are implemented, at least in part, using software-controlled data processing apparatus, it will be appreciated that a computer program providing such software control and a storage or transmission medium by which such a computer program is stored are envisaged as aspects of the present invention.

The invention claimed is:

1. A method performed by a computer of forming a two dimensional map of a three dimensional environment, there being a map origin located in the three dimensional environment, a viewing direction vector defined passing through the map origin, and a one-to-one correspondence between map positions in the map and the directions of vectors passing through the map origin;

the method comprising the steps of:
associating by the computer an environment position in the three dimensional environment with a folded vector that passes through the map origin, the folded vector lying in a plane containing both the viewing direction vector and the environment position and forming an angle with the viewing direction vector that is a predetermined function of the angle between the viewing direction vector and a vector between the map origin and the environment position;

associating by the computer an environment position with the map position corresponding to the direction of the folded vector associated with that environment position; and deriving by the computer properties for a map position from the properties of the corresponding environment position;

wherein the predetermined function is a multiplication by 0.5.

2. A method according to claim 1, in which the one-to-one correspondence of a map point with the direction of a vector through the map origin represents a projection onto a predetermined plane of a point on the vector which is a predetermined distance from the map origin.

3. A method according to claim 2, in which the predetermined plane is a plane orthogonal to the viewing direction vector.

4. An image rendering method comprising the steps of:
generating a two dimensional map of a three dimensional environment using a method according to claim 1;

for a point of interest on an object to be displayed, deriving a reflection vector in dependence on a normal vector at the point of interest and a direction of view;

referencing a position in the two dimensional map using the reflection vector, to detect environmental properties at that map position; and varying the appearance of the object at the point of interest in dependence on the detected environmental properties.

5. A method according to claim 4, in which the varying step is performed in dependence on a reflectivity of the object at the point of interest.

6. A method according to claim 4, in which the environmental properties represent lighting properties.

7. A non-transitory computer-readable medium having instructions stored therein which when executed, cause a computer to perform the method according to claim 1.

8. Apparatus for forming a two dimensional map of a three dimensional environment, there being a map origin located in the three dimensional environment, a viewing direction vector defined passing through the map origin, and a one-to-one correspondence between map positions in the map and the directions of vectors passing through the map origin; the apparatus comprising:

means for associating an environment position in the three dimensional environment with a folded vector that passes through the map origin, the folded vector lying in a plane containing both the viewing direction vector and the environment position and forming an angle with the viewing direction vector that is a predetermined function of the angle between the viewing direction vector and a vector between the map origin and the environment position;

means for associating an environment position with the map position corresponding to the direction of the folded vector associated with that environment position; and means for deriving properties for a map position from the properties of the corresponding environment position;

wherein the predetermined function is a multiplication by 0.5.

9. An image rendering apparatus comprising:

map generating apparatus according to claim 8;

means for deriving a reflection vector, in respect of a point of interest on an object to be displayed, in dependence on a normal vector at the point of interest and a direction of view;

means for referencing a position in the two dimensional map using the reflection vector, to detect environmental properties at that map position; and means for varying the appearance of the object at the point of interest in dependence on the detected environmental properties.

10. A video game machine comprising apparatus according to claim 8.

* * * * *